XEROGRAPHIC COPIER

Filed April 14, 1951

INVENTORS
CLYDE R. MAYO
EDWARD R. SABEL

BY Frank A. Steinhilper

ATTORNEY

INVENTORS
CLYDE R. MAYO
EDWARD R. SABEL

BY Frank A. Steinhilper

ATTORNEY

INVENTORS
CLYDE R. MAYO
EDWARD R. SABEL
BY Frank A. Steinhilper
ATTORNEY

Feb. 19, 1957 C. R. MAYO ET AL 2,781,704

XEROGRAPHIC COPIER

Filed April 14, 1951 5 Sheets-Sheet 4

INVENTORS
CLYDE R. MAYO
EDWARD R. SABEL

BY Frank A. Steinhilper

ATTORNEY

INVENTORS
CLYDE R. MAYO
EDWARD R. SABEL

BY Frank A. Steinhilper

ATTORNEY 2,781,704

XEROGRAPHIC COPIER

Clyde R. Mayo and Edward Raymond Sabel, Rochester, N. Y., assignors to The Haloid Company, Rochester, N. Y., a corporation of New York Application April 14, 1951, Serial No. 221,103

2 Claims. (Cl. 95—1.7)

This invention relates in general to xerography and in particular to apparatus and to equipment for performing xerographic processes.

In copying documents, letters, and the like by xerographic processes it has previously been the practice except for special purposes to employ a contact reproduction system in which the copy is reproduced through contact exposure with a xerographic-sensitive member, such a contact reproduction system being selected for 1:1 reproduction largely because of its compactness and ease of operation. Inasmuch as the process of xerography as previously commercially employed has dealt with limited space for equipment, and further because of criticality of illumination intensity and other related problems, it has heretofore appeared unattractive to employ any system of exposure by projection for the 1:1 reproduction except for extremely small copy. It has been recognized, however, that a projection method of reproduction has numerous advantages both with reference to the type of material being reproduced and with reference to the xerographic process itself, and thus it has been desirable to extend the art of xerography to include reproduction of copy by projection.

It is therefore an object of this invention to provide equipment and apparatus for the operation of xerography through a projection process.

It is a further object of this invention to provide xerographic projection apparatus of suitable size and dimensions for reproducing office and legal documents in a space having dimensions suitable for manual operation.

It is a further object of this invention to provide xerographic apparatus and equipment for projection reproduction of documents and the like wherein a high degree of uniformity of image projection can be achieved within normally useful space dimensions.

It is an additional object of the invention to provide new and improved xerography apparatus and equipment for carrying out the xerographic processes through a projection step.

Additional objects are in part obvious and are in part apparent from the following specification and from the drawings in which.

Figure 1:
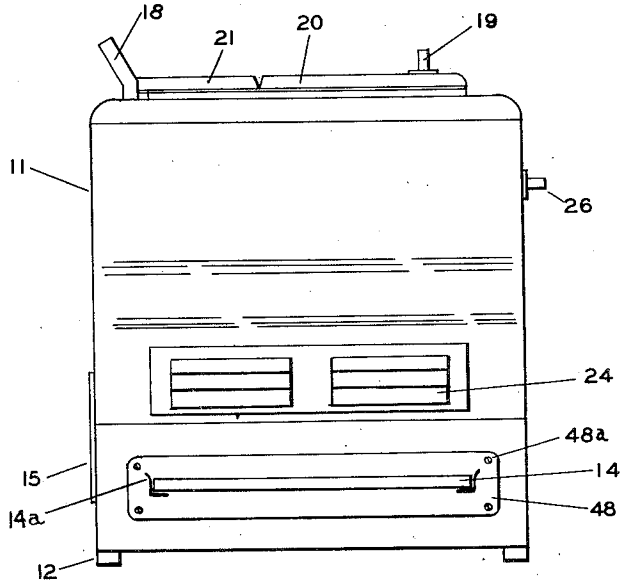
Figure 1 is a front elevation of xerographic equipment according to one embodiment of the invention.
Figure 2:
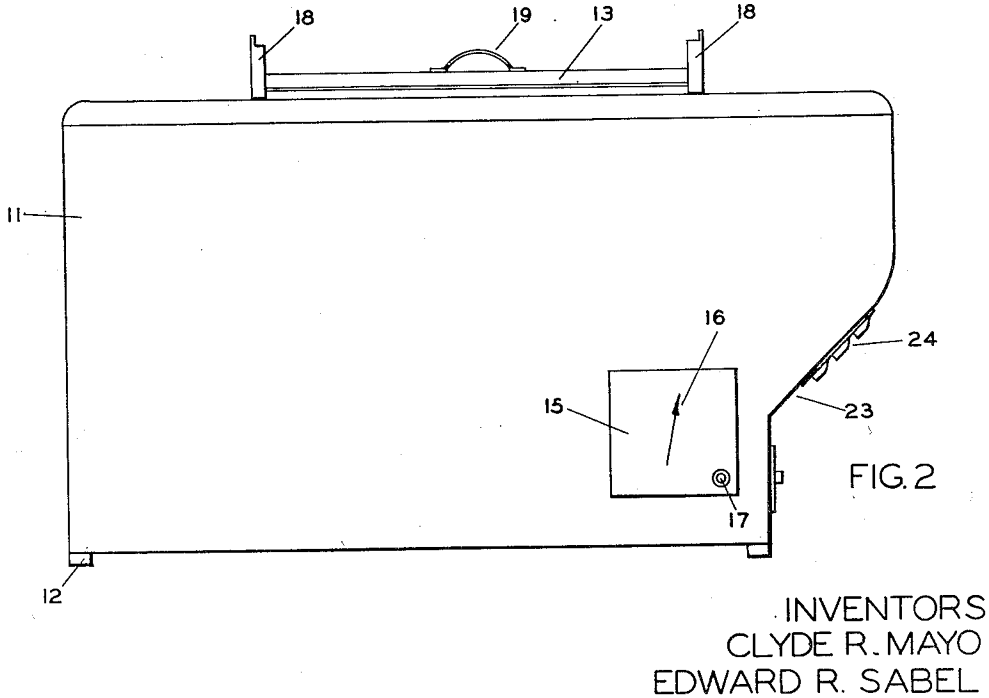
Figure 2 is a side elevation of the equipment shown in Figure 1.

Referring to the figures in detail, there is shown in Figures 1 and 2 the outer views and mechanism of xerographic apparatus and equipment according to one form of this invention. The equipment comprises generally a cabinet 11 on legs or feet 12 having a hinged cover 13, preferably on its top surface, and a slot or other opening 14 adapted to receive a xerographic plate. Mounted on the cabinet 11 is a timer unit 15 having a time indicating member 16 shown in Figure 2 by an arrow and having an operating button 17. Associated with the cover 13 is a hinged supporting mechanism 18 and a handle 19 whereby the cover may be raised from one end. Preferably the cover 13 consists of separate members 20 and 21 secured to a flexible sheet 22 and supported by hinges 65 (see Figure 6), thereby being hinged together along a line parallel with the hinged support 18 so that the cover member may be raised or lowered in at least two sections.

The cabinet 11 is generally rectangular in shape having, however, a somewhat longer upper portion than lower portion. In this manner the front wall 23 of the cabinet extends inwardly toward the base of the cabinet and on this sloping portion of the front wall are mounted louvers or openings 24. On one of the walls of the cabinet and near the top thereof is a removable panel 25 (Figure 3) which may be secured in place or removed by means of handle 26.

Figure 3:
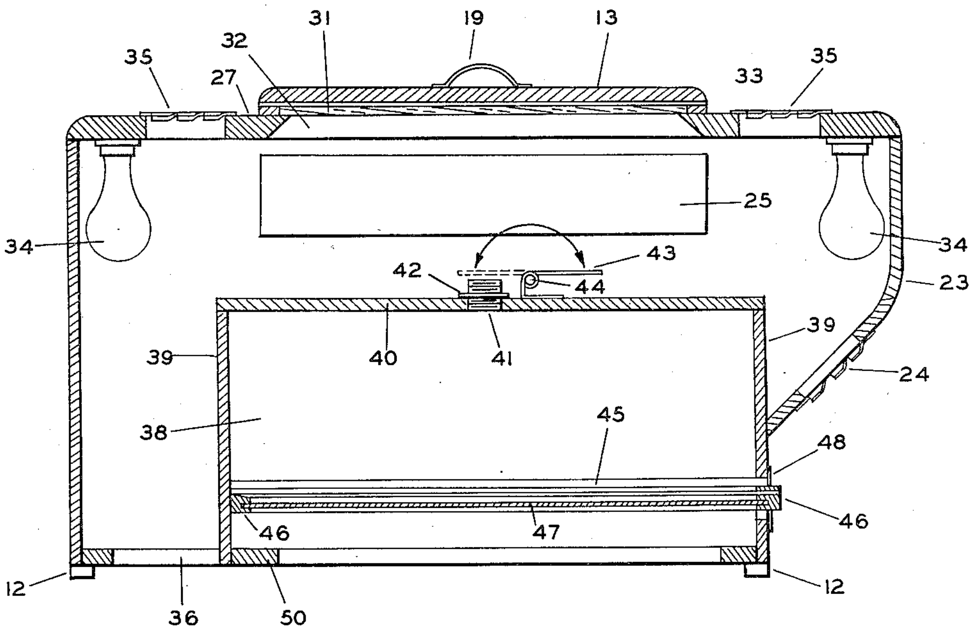
Figure 3 is a side elevation in section of the equipment shown in the previous figures.
Figure 4:
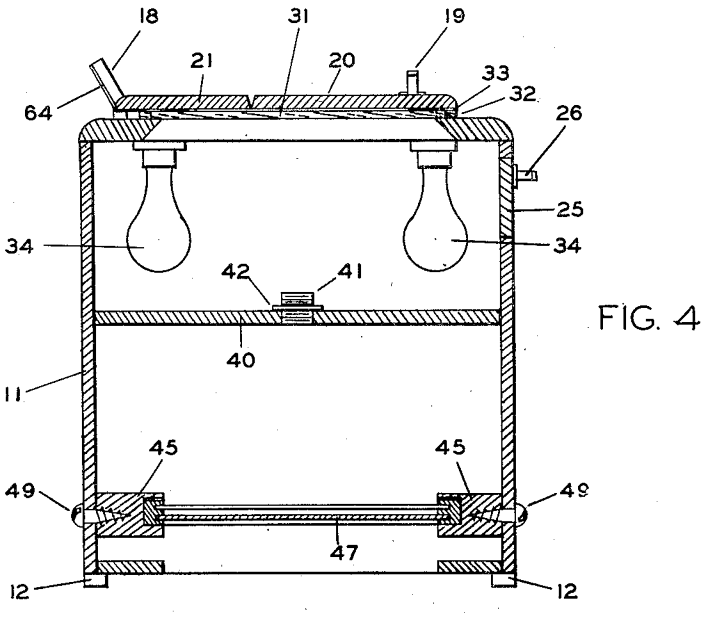
Figure 4 is a front elevation in section of the equipment shown in previous figures.

Figures 3 and 4 illustrate the internal structure and mechanisms of the device shown in Figures 1 and 2. Adjacent to and positioned directly under cover 13 is an exposure panel 31 which in turn is mounted in frame 33 over an exposure opening 32, the panel resting on the upper wall 27 of the cabinet. The cover 13 is mounted over this panel and opening in such a manner and position as to substantially completely cover and block the opening when the cover is in its closed position and to substantially and completely expose the panel 31 when in its open position. In front and in back of the exposure zone as defined by panel 31 and opening 32 are mounted pairs of lights 34, each of the lights being mounted slightly beyond the longer end of the panel and roughly opposite the corner thereof in the position illustrated in the drawing and as further described hereinafter. The edges of the exposure panel are bevelled away from the exposure opening at angles sharper than the angles to the exposure lamps, whereby substantially no shadow from the wall 27 is cast on the panel. Additional ventilation openings or louvers 35 are provided in the top of the cabinet consisting of slantingly-mounted strips of material positioned in the conventional manner to permit air to pass thereto but to prevent significant passage of light. In addition, an opening 36 in the base of the cabinet toward the rear thereof serves as an additional ventilation means, whereby louvers 24 and front louvers 35 form a ventilation channel for the front lights in the cabinet, and opening 36 and rear louver 35 form a similar ventilation channel for the rear lights.

Within the outer or principal cabinet 11 is an inner chamber or camera housing 38 in part bounded by interior side walls 39 and upper wall 40, and in part having common walls with the outer chamber. In the upper wall 40 of this chamber is mounted a lens 41 in a threaded barrel housing, this lens being positioned substantially directly beneath the exposure panel 31 and being adapted to receive and focus a light image from said panel. A check ring 42 is screwed onto the lens housing to tighten the lens housing into position after focusing. A color filter 43 is, optionally, pivotally mounted on a support 44 in a position to cover lens 41 as illustrated by the dotted lines in Figure 3 or to be moved free from the lens as illustrated by the solid lines. Within the inner chamber 38 are mounted guide members 45 having channels to receive the frame 46 of a xerographic plate 47, and to position the plate in the plane where the exposure image is focussed by lens 41. At the front end of these channels is a plate 48 mounted, for example, by screws 48*a* (see Figure 1) and bearing entrance slot 14 in a communicating relationship to the channels of members 45, whereby the xerographic plate and frame may be inserted into the inner chamber. Flared corner guides 14*a* on plate 48 serve to receive frame 46 and guide it into slot 14. Preferably this plate 48 is removable from the cabinet and thus can be mounted on the cabinet after the assembly is otherwise completed to permit a degree of flexibility in the positioning of the channels and the plate to compensate for minor variations in lens focal length. Similarly, support members 45 are mounted to the side walls of the cabinet by screws 49 at an adjusted height, depending on the same minor lens variation.

Optionally, the base 50 of the cabinet may have a central opening to permit easy access to the interior of chamber 38. Since the cabinet generally is placed on a solid flat surface and, furthermore, since the xerographic plate is normally inserted in the cabinet with its sensitive surface shielded from this spot on the wall, the amount of light allowed to enter the chamber 38 through this opening is generally not detrimental.

Figure 5:
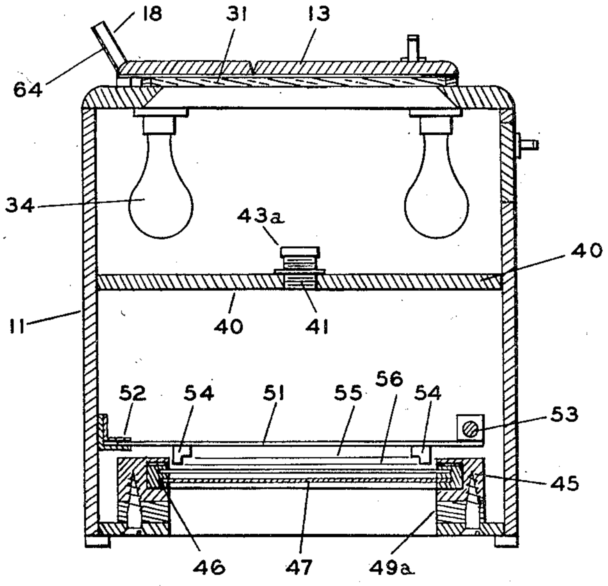
Figure 5 is a front elevation in section of a device according to another embodiment of the invention.

In Figure 5 there is shown a modified embodiment of this invention somewhat similar to the embodiment shown in Figure 4, and comprising a cabinet 11 having a cover 13 positioned over an exposure panel 31 and having lamps 34 mounted adjacent to the exposure panel and a lens supporting light barrier 40 or top wall of an inner chamber, all as shown in Figure 4. A light filter cap 43*a* is positionable over the lens housing. In the lower or inner chamber are support members 45 adjustably mounted on shims 49*a* to slidably receive and support a xerographic plate 47 and frame 46. Closely above the position of this plate 47 when supported thereon is an electrode support 51 which is horizontally slidable in a frame on runners 52, mounted on the wall of the cabinet with its horizontal motion controlled by a drive member 53 whereby the electrode support 51 is carried across the focal plane adjacent to the surface of the xerographic plate 47. On this electrode support are corona electrode frame members 54 carrying a corona electrode 55 and, optionally, a corona discharge control electrode 56. The corona electrode 55, optionally, may consist of one or more fine conductive strands parallel with the surface of the xerographic plate and movable thereacross and held at a potential in the order of several thousand volts, whereby a corona discharge occurs around the conductive strands, and the corona control electrode 56 correspondingly may comprise one or more fine conductive strands parallel to the corona electrode and positioned between said electrode and the xerographic plate and held at an intermediate or control potential in the order of the potential desired on the xerographic plate, all according to the construction and manner of operation of copending application Serial No. 154,295, Lewis E. Walkup, Charging Device.

Figure 8:
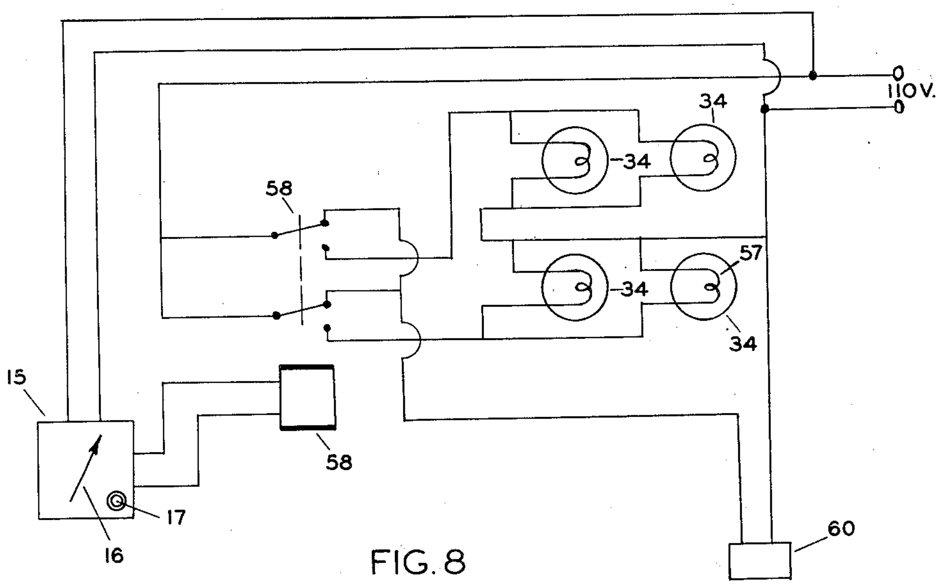
Figure 8 is a schematic wiring diagram for the device illustrated in the preceding figures.

The use and operation of the apparatus and equipment may best be understood with reference to the schematic wiring diagram shown in Figure 8. This diagram shows lamps 34 having filaments 57 connected through relay 58 to a power source such as, for example, a 110-volt alternating current source, the relay being controlled by timer unit 15 mounted on the side of the cabinet. Other electrical equipment 60 operating on the same electrical circuit is also connected to relay and adapted to be energized thereby only when the lamp circuit is open whereby voltage fluctuations resulting from such equipment cannot affect the operation of the exposure lamps. For example, it is contemplated that the apparatus of this invention will be operated in conjunction with a thermostatically controlled fuser which draws large flow of energy at erratic time intervals, such as to cause unpredictable variation in the line voltage with consequent non-uniformity of lamp intensity. This and similar sources of non-uniform operation are hereby avoided.

To operate the device, the cover 13 is first raised and copy to be reproduced is placed thereunder against the exposure panel 31 with the image face of the copy against the exposure panel. The cover is then closed, a xerographic member or plate is inserted through slot 14 and the timer indicator 15 on the side of the box is set for the desired exposure time. The timer button 17 is then pressed energizing relay 58, closing the lamp circuit to light the lamps 34, and simultaneously deenergizing the circuit to other electrical equipment 60 on the same circuit or operated from the same power outlet, such as, for example, a xerographic fuser. The timer then operates to light the lamps for the desired length of time after which the relay operates to close the circuit to the fuser and simultaneously open the lamp circuit. As a result of this, the lamps 34 adjacent to the exposure panel 31 are lighted for the desired time causing a flood of illumination across the copy to be reproduced, thereby projecting an image of said copy onto the surface of the xerographic plate, thus exposing the plate.

According to one embodiment of the invention, the xerographic plate is externally charged or energized after which it is placed within the cabinet 11 on support members 44 and the exposure is carried out as indicated, thus exposing and producing an electrostatic latent image on the sensitized xerographic plate. According to another embodiment of the invention, as illustrated in Figure 5, the xerographic plate is inserted in the support members 45 and is there charged or sensitized by means of the corona discharge electrode 55. This charging step being completed, the lamps 34 are then lighted to expose the plate to the desired image, all as described hereinbefore. Optionally, the operation may be made automatic through use of proper relays, etc., and the charging and exposing steps may follow automatically from pressing the single timer button. In either event, and according to either embodiment of the invention as described herein, the sensitized and exposed xerographic plate is then developed to yield a visible image according to the procedure of xerography. If desired, lens 41 may be provided with a shutter which may be operated mechanically or manually, but which preferably is operated by relay 58 by suitable electrical means (not shown)

Figures 6, 7:
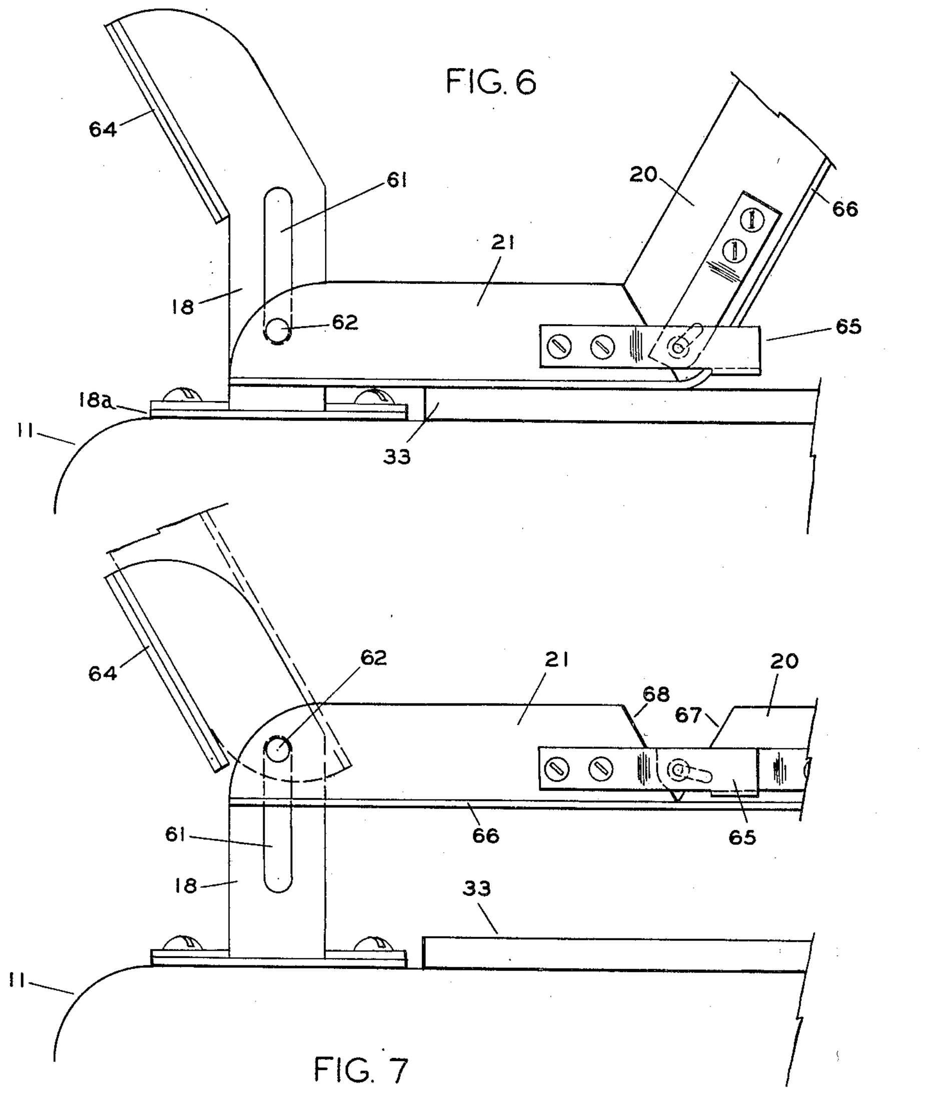
Figure 6 is an enlarged fragmentary side elevation of a portion of the device shown in the preceding figures.
Figure 7 is an enlarged fragmentary side elevation of the device of Figure 6, illustrated in a different position.

In Figures 6 and 7 is shown in greater detail a cover mounting structure whereby additional flexibility is achieved with respect to the ability of the apparatus and equipment to receive and operate with copy of different size and thickness, and to operate more efficiently and easily with copy of all types. As illustrated in the figures, supporting frames 18 are mounted on the top of cabinet 11, optionally by removable screws or the like which secure frame 18 to a plate 18*a* permanently mounted on the cabinet. On each of the supported frames is a vertically elongated slot 61 engaged by a pin 62 on the cover member, whereby the cover is pivotally mounted on the frame and can be secured in a raised or lowered position. In addition, the frame 18 has on its upper portion a rearwardly inclined rest 64 to receive and support the cover in an open position. The cover member is composed of two separate sections 20 and 21 which are hinged together with hinges 65 and secured to flexible sheet 66. The hinges operate to permit flexing at the joint between member 20 and 21 and to support them free from strain on sheet 66, and which terminate in two facing bevels 68 and 67, whereby front cover member may be raised to a substantial angle independently of the rear cover member, to permit changing of copy without disturbing the position of the entire assembly. The operation of the cover and its mounting frame are illustrated in the two figures and in the dotted lines showing the various positions of the cover.

For a fuller understanding of the operation of the apparatus according to this invention, further reference is made to the drawings, and in particular to Figures 3 and 4. As shown in these figures and as previously referred to, lens 41 is mounted and positioned to focus an image of the exposure copy on the upper surface of the xerographic plate 47 when such plate is placed in the apparatus. Inasmuch as this apparatus is designed to be operated in somewhat limited space and, further, inasmuch as it is designed for manual operation in a vertical position, the distance between the copy and the focal plane must be kept relatively short for compactness and to eliminate bending or stooping by the operator. Thus, the distance generally must be kept shorter than about three feet, usually, for best operation, about 18 inches, necessitating a lens focal length shorter than about 9 inches, and usually about 4 to 5 inches. This arrangement, however, is far from conventional, because the apparatus is designed for copying documents such as legal size papers and the like, and the total distance between the copy and the focal plane therefore is roughly in the same range of distance as the diagonal of the exposure panel. To those skilled in the art, it is apparent that this distance is generally about one-quarter of the normal distance between copy and focal plane for 1:1 projection in view of the general understanding that this distance should be four times the diagonal.

The desired results in the form of compactness and convenience of design and construction are achieved and are coordinated by employing a lens capable of operating over a wide angle of projection and by carefully mounting and positioning the lamps 34 to critically selected positions with respect to the exposure panel. In the specific design and construction illustrated and described herein, the angle subtended by the diagonal of the exposure panel, with respect to the lens, is at least about 60° and generally is about 90° or, in other words, the angle between the axis of the lens and the corner of the exposure panel is at least about 30° and usually about 45°. Because of this extreme angle, the illumination transmitted through the lens to the sensitized plate is very sharply distorted. It can be seen that light near the corners of the copy must leave the surface at an extremely flat angle in order to reach the lens, and after passing through the lens it then strikes the plate at a similar flat angle. Thus, by sheer geometry there is a tremendous loss in efficiency at these wide or flat angles. In addition to this loss that occurs in even a theoretically perfect system, there are further losses in the edge and corner areas due to lens characteristics, reflections from the plate surface, roughness or gloss of the surface of the paper or other object being copied, etc. With all of these theoretical and practical losses of illumination, it has been found that uniform illumination on the copy produces an image less than ⅛ as bright at the corners as in the center. In the case of xerographic work, unlike many forms of silver photography, no part of this light intensity distortion can be reversed through later copying of a negative image through the same lens, and therefore deliberate non-uniformity of illumination is employed.

In the coordinated structure and assembly employed for light equalization, a wide angle lens is selected, the lens being capable of reproducing and focussing an image at least across a subtended angle of 90°. As illustrated in Figure 3, lamps 34 are placed closely beside the exposure panel, roughly beyond the long sides of the panel and closely adjacent thereto. These lamps, according to one embodiment of the invention are No. 1 Photoflood lamps, mounted one at each corner of the panel. The lamps are entirely above the angle of reflection to the lens and are as close to the exposure as compatible with such angle of reflection. With this positioning of the lamps, the illumination at the edges and corners is many times as intense as at the center, largely and effectively, though not completely, compensating for the non-uniform light transmission.

By the interrelation and co-ordination of lens characteristics, illumination balancing, and mechanical design and construction, all as described herein, apparatus has been constructed to enable a single operator by convenient manual operation to produce an accurate reproduction of a wide variety of office and legal documents and writings with a minimum of physical effort. The quality of the reproduction is excellent, being well balanced in tone throughout its entire area, and being substantially free from imperfections and flaws. In fact, this apparatus is particularly advantageous in certain instances where the ultimate copy actually shows greater clarity and better detail than the original itself.

It will be understood that modifications can be made in the structures and mechanisms described herein without departing from the scope of the invention and that the invention is to be interpreted in light of the appended claims.

What is claimed is:

1. Xerographic exposing apparatus for exposing an electrophotographically sensitive plate to a projected light image of a document to be reproduced adapted to operate in conjunction with other electrical equipment on the same electrical circuit such as xerographic fusing apparatus and the like, said exposing apparatus comprising a cabinet having a lamp compartment and a closed light-impervious camera chamber, said lamp compartment overlying said camera chamber and having extensions projecting respectively forwardly and rearwardly of the ends of said camera chamber, a transparent exposure panel in the top wall of said lamp compartment, a plurality of lamps mounted at spaced positions within the extensions of said lamp compartment adjacent to the periphery of said exposure panel providing at least twice as brilliant illumination of the corners and edges of said panel than at the center portion of said panel, said extensions of said lamp compartment having air vents in the top and bottom respectively thereof to permit free flow of cooling air across said lamps during operation of said apparatus, a hinged cover connected to said top wall of said lamp compartment adjustably positionable over said exposure panel for retaining thereon the document to be reproduced, a wide angle lens having a focal length of less than about 4½ inches mounted in the upper wall of said camera chamber centered beneath said exposure panel, the angle between the axis of said lens and a corner of said exposure panel being greater than 30 degrees and the lamps being positioned beyond the angle of reflection from the exposure panel to the lens, the front wall of said cabinet having a horizontal slot therein below the forward extension of said lamp compartment and opening into said camera chamber to permit the insertion of an electrophotographically sensitive plate into said camera chamber, horizontal guide means adjustably mounted within said camera chamber in cooperation with said slot to receive and guide the plate thereinto and adapted to allow a light shield to be removed and inserted at said plate while in said guide means, and a relay operating to close an electrical circuit including the lamps and simultaneously opening an electrical circuit including other electrical equipment operating from the same power outlet.

2. Xerographic exposing apparatus for exposing an electrophotographically sensitive plate to a projected light image of a document to be reproduced adapted to operate in conjunction with other electrical equipment on the same electrical circuit such as xerographic fusing apparatus and the like, said exposing apparatus comprising a cabinet having a lamp compartment and a closed light-impervious camera chamber, said lamp compartment overlying said camera chamber and having extensions projecting respectively forwardly and rearwardly of the ends of said camera chamber, a transparent exposure panel in the top wall of said lamp compartment, a plurality of lamps mounted at spaced positions within the extensions of said lamp compartment adjacent to the periphery of said exposure panel providing at least twice as brilliant illumination of the corners and edges of said panel than at the center portion of said panel, said extensions of said lamp compartment having air vents in the top and bottom respectively thereof to permit free flow of cooling air across said lamps during operation of said apparatus, a hinged cover connected to said top wall of said lamp compartment adjustably positionable over said exposure panel for retaining thereon the document to be reproduced, a wide angle lens having a focal length of less than about 4½ inches mounted in the upper wall of said camera chamber centered beneath said exposure panel, the angle between the axis of said lens and a corner of said exposure panel being greater than 30 degrees and the lamps being positioned beyond the angle of reflection from the exposure panel to the lens, the front wall of said cabinet having a horizontal slot therein below the forward extension of said lamp compartment and opening into said camera chamber to permit the insertion of an electrophotographically sensitive plate into said camera chamber, horizontal guide means adjustably mounted within said camera chamber in cooperation with said slot to receive and guide the plate thereinto and adapted to allow a light shield to be removed and inserted at said plate while in said guide means, charging means within said camera chamber to impose an electrostatic charge on a xerographic plate positioned in said horizontal guide means, and a relay operating to close an electrical circuit including the lamps and simultaneously opening an electrical circuit including other electrical equipment operating from the same power outlet.

References Cited in the file of this patent

UNITED STATES PATENTS

| | | |
|---|---|---|
| 780,590 | Anderson | Jan. 24, 1905 |
| 1,000,154 | Crosier | Aug. 8, 1911 |
| 1,527,883 | Lare | Feb. 24, 1925 |
| 1,635,741 | Carpio | July 13, 1927 |
| 1,687,069 | Iser | Oct. 9, 1928 |
| 1,748,523 | Smith | Feb. 25, 1930 |
| 1,844,179 | Rennick | Feb. 9, 1932 |
| 2,032,930 | Gazulla et al. | Mar. 3, 1936 |
| 2,124,954 | Pirmov | July 26, 1938 |
| 2,350,761 | Hutchinson | June 6, 1944 |
| 2,383,115 | Durand | Aug. 21, 1945 |
| 2,516,724 | Roossinov | July 25, 1950 |
| 2,551,582 | Carlson | May 8, 1951 |
| 2,600,580 | Sabel et al. | June 17, 1952 |